United States Patent
Stanforth

(12) 
(10) Patent No.: US 7,167,715 B2
(45) Date of Patent: Jan. 23, 2007

(54) SYSTEM AND METHOD FOR DETERMINING RELATIVE POSITIONING IN AD-HOC NETWORKS

(75) Inventor: Peter J. Stanforth, Winter Springs, FL (US)

(73) Assignee: MeshNetworks, Inc., Maitland, FL (US)

(*) Notice: Subject to any disclaimer, the term of this patent is extended or adjusted under 35 U.S.C. 154(b) by 157 days.

(21) Appl. No.: 10/402,961

(22) Filed: Apr. 1, 2003

(65) Prior Publication Data

US 2004/0082341 A1 Apr. 29, 2004

Related U.S. Application Data

(60) Provisional application No. 60/380,851, filed on May 17, 2002.

(51) Int. Cl.
*H04Q 7/20* (2006.01)

(52) U.S. Cl. ............... 455/457; 455/456.6; 455/456.5; 455/11.1; 709/224; 340/573.4; 340/539.13

(58) Field of Classification Search ............ 455/456.1, 455/456.3, 456.5, 456.6, 553.1, 11.1, 457; 340/573.4, 539.13, 524; 709/224
See application file for complete search history.

(56) References Cited

U.S. PATENT DOCUMENTS

| | | | |
|---|---|---|---|
| 4,494,192 A | 1/1985 | Lew et al. ............... 364/200 |
| 4,617,656 A | 10/1986 | Kobayashi et al. ........... 370/74 |
| 4,736,371 A | 4/1988 | Tejima et al. ................ 370/95 |
| 4,742,357 A | 5/1988 | Rackley ..................... 342/457 |
| 4,747,130 A | 5/1988 | Ho ............................ 379/269 |
| 4,910,521 A | 3/1990 | Mellon ....................... 342/45 |
| 5,034,961 A | 7/1991 | Adams ....................... 375/130 |
| 5,055,851 A | 10/1991 | Sheffer |
| 5,068,916 A | 11/1991 | Harrison et al. ............. 455/39 |

(Continued)

FOREIGN PATENT DOCUMENTS

CA 2132180 3/1996

(Continued)

OTHER PUBLICATIONS

Borre et al., "Mathematical Challenges In Global Positioning Systems (GPS)", Aug. 16-18, 2000, IMA "Hot Topics" Workshop, Univ. of Minnesota.

(Continued)

*Primary Examiner*—Danh Cong Le
(74) *Attorney, Agent, or Firm*—Randi L. Karpinia; Joseph J. Buczynski

(57) ABSTRACT

A system and method for improving the ability of a portable voice and data wireless communications network to provide position information regarding mobile nodes located within a network. The system and method employs mobile access points, wireless routers, and mobile nodes, which each contain at least one transceiver, and are mounted or dispersed at a geographic location. Access points can be connected to mobile vehicles, or connected to a network management system, and wireless routers can be mounted to portable stands for easy deployment. Mobile nodes can be attached to equipment or personnel for tracking purposes, and each node includes technology which may determine an absolute node location containing latitude, longitude and altitude of a node, or a relative node location containing the distance and angle between nodes, or a combination of both absolute and relative location data.

33 Claims, 6 Drawing Sheets

U.S. PATENT DOCUMENTS

| | | | |
|---|---|---|---|
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,905,450 A * | 5/1999 | Kim et al. | 340/967 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/456 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,542,819 B1 * | 4/2003 | Kovacs et al. | 701/213 |
| 6,697,649 B1 * | 2/2004 | Bennett et al. | 455/574 |
| 6,987,975 B1 * | 1/2006 | Irvin et al. | 455/456.1 |
| 2001/0003191 A1 | 6/2001 | Kovacs et al. | |
| 2001/0021654 A1 * | 9/2001 | Spratt et al. | 455/500 |
| 2001/0053699 A1 | 12/2001 | McCrady et al. | 455/513 |
| 2002/0028674 A1 | 3/2002 | Slettengren et al. | |
| 2002/0059420 A1 * | 5/2002 | Lin et al. | 709/224 |
| 2003/0214397 A1 * | 11/2003 | Perkins et al. | 340/524 |
| 2003/0214410 A1 * | 11/2003 | Johnson et al. | 340/573.4 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | 01/57547 | 8/2001 |
| WO | WO 01/57547 * | 8/2001 |
| WO | WO 0235253 | 5/2002 |

OTHER PUBLICATIONS

Wendy J. Woodbury Straight, L.S., "Exploring A New Reference System", Jan. 1998.

Moeglein et al., "An Introduction To SnapTrack Server-Aided GPS Technology", ION GPS-98 11th International Technical Meeting of the Satellite Division of the Institute of Navigation, Sep. 15-18, 1998, Nashville Convention Center, Nashville, Tennessee.

Nokia, "Mobile Location Services", Nokia White Paper, 2001.

"E911 Location Technologies", DISPATCH Monthly, Nov. 2000.

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR DETERMINING RELATIVE POSITIONING IN AD-HOC NETWORKS

This application claims benefit under 35 U.S.C. §119(e) from U.S. Provisional Patent Application Ser. No. 60/380,851 entitled "A System And Method For Determining Relative Positioning In Ad-Hoc Networks", filed on May 17, 2002, the entire contents of which is incorporated herein by reference.

BACKGROUND OF THE INVENTION

1. Field of the Invention

The present invention relates to a system and method for providing position information of mobile user terminals in a portable voice and data wireless communications network, such as an ad-hoc wireless communications network. More particularly, the present invention relates to a system and method for computing the location of a mobile terminal in a wireless communications network, such as an ad-hoc terrestrial wireless communications network, based on estimated distances from a user terminal to a plurality of portable terrestrial reference terminals. If the terrestrial reference terminals contain latitude, longitude, and altitude location, the absolute location of the user terminal may be determined, otherwise a relative location may be determined.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each application being incorporated herein by reference.

In either conventional wireless communications networks, or in ad-hoc wireless communications networks, it may be necessary or desirable for a mobile node to be capable of knowing or determining its geographic location. Details of location determining services and techniques for wireless communications networks are described in a Nokia White Paper entitled "Mobile Location Services", the entire content of which being incorporated herein by reference.

In particular, the Nokia document states that location identification services are currently provided in wireless communications networks based on three major technologies. One of these technologies uses cell identification combined with Round Trip Time (RTT), Timing Advance (TA) and Measured Signal level (RX level), Time Difference of Arrival (TDOA) and Angle of Arrival (AOA) techniques, the details of which can be appreciated by one skilled in the art. A second technology uses cellular signal timing based methods for code division multiple access (CDMA) and wideband code division multiple access (WCDMA). The third technology described in the Nokia document employs Global Positioning System (GPS) techniques.

Another list of methods and techniques currently used in the wireless communications industry for providing location services is presented in an article by DISPATCH Monthly entitled "E911 Location Technologies", the entire content of which is incorporated herein by reference. Although the GPS technique is the last technique mentioned in this list, it generally is viewed as being more accurate than all other methods listed. Further details and descriptions of GPS based methods are set forth in a publication by J. J. Spilker Jr. entitled "Satellite Constellation and Geometric Dilution of Precision" in "GPS—Theory and Applications", American Institute of Astronautics, Inc., 1996, also in a publication by P. Axelrad et al. entitled "GPS Navigation Algorithms" in "GPS—Theory and Applications", American Institute of Astronautics, Inc., 1996, also in a publication by Bradford W. Parkinson entitled "GPS Error Analysis" in "GPS—Theory and Applications", American Institute of Astronautics, 1996, and in a publication by N. Ashby et al. Entitled "Introduction to Relativistic Effects on the Global Positioning System" in "GPS—Theory and Applications", American Institute of Astronautics, 1996, the entire contents of each of these publications being incorporated herein by reference.

Despite the fact that the GPS technique has been in use for a considerable period of time and most of the world's navigation relies on this technique, the GPS technique is very susceptible to errors in measurement. Therefore, the GPS technique is capable of providing location determination results with very high accuracy only after performing a relative large number of measurements to remove such errors. A description of the shortcomings of GPS is set forth in a document by the Institute For Mathematics and its Applications (IMA) entitled "Mathematical Challenges in Global Positioning Systems (GPS)", the entire content of which being incorporated herein by reference. Certain other tests also demonstrate that the GPS technique is unsuitable for terrestrial-based networks.

In addition, other methods and techniques which do not use GPS satellites for determining mobile station locations in a wireless communications network typically require that the signal from the mobile station be received by at least two cell sites that can measure and process the delay between signal arrivals, identify the direction of the signal based on "path signature" and determine the distance between the mobile station and the cell towers.

In all of these methods, the processing of the information is executed in a designated central processing unit (CPU) which is typically located at a cell tower next to the base station (BTS). Also, most of these methods were designed to comply with E911 requirements without requiring that excessive modifications be made to existing wireless communications systems. Examples of other location determining techniques are set forth in a document by Wendy J Woodbury Straight entitled "Exploring a New Reference System", and in a document entitled "An Introduction to SnapTrac Server-Aided GPS Technology", the entire contents of each of these documents being incorporated herein by reference.

To overcome the above issues with determining location information, ad-hoc networks are being developed which do not require either the use of satellites or a centralized computing facility for determining location information. Further details of such ad-hoc networks are described in U.S. Pat. No. 6,728,545 entitled "A System and Method for Computing the Location of a Mobile Terminal in a Wireless Communications Network", issued on Apr. 27, 2004, the entire contents of which is incorporated herein by reference.

Additionally, ad-hoc networks can be developed which utilize non-fixed, or movable infrastructure components which can provide a user with an absolute geographic location. Further details of networks using movable access points and repeaters for minimizing coverage and capacity constraints are described in U.S. patent application publication No. 20030091010A1 entitled "Movable Access Points and Repeaters for Minimizing Coverage and Capacity Constraints in a Wireless Communications Network and a Method for Using the Same", filed Aug. 15, 2001, the entire content being incorporated herein by reference.

The publications discussed above generally relate to mobile networks that connect to a permanent fixed network where location information is presented as absolute locations. However, as can be appreciated from the patent applications referenced above, temporary ad-hoc networks do not necessarily have the same requirements. Therefore, a need exists for a portable, easily deployed, self-contained ad-hoc network system where relative location detection is desired. The relative location may be in addition to, or in replacement of absolute geo-location.

Accordingly, a need exists for an improved system and method for easily determining the relative location of a mobile node in a portable wireless communications network that substantially eliminates the drawbacks associated with fixed infrastructures.

SUMMARY OF THE INVENTION

An object of the present invention is to provide a system and method for deploying nodes about a deployment area, and establishing communications for computing the location of a mobile node in a portable voice and data wireless communications network, such as an ad-hoc wireless communications network, based on estimated distances from a node to a plurality of terrestrial reference terminals.

Another object of the present invention is to provide a system and method to present node location information as a relative location containing distance and angle between nodes in a deployment area.

Another object of the present invention is to provide a system and method to present node location information as an absolute location containing latitude, longitude and altitude when the reference terminals contain absolute geolocation data.

Another object of the present invention is to provide a system and method to present node paths illustrating node travel routes and routes between nodes in a deployment area.

These and other objects are substantially achieved by providing a system and method for deploying a plurality of nodes about an area, and establishing node communications within the deployment area, either directly, or via one or more other nodes as routers. The plurality is used to determine locations of one or more nodes about the area, and communicate the information to a single node, which is used to display position information as any one of a relative or absolute node position.

The system and method performs the operation of, receiving respective signals from each of a plurality of reference terminals at a user terminal, with each respective signal including information representing a location of its respective reference terminal. The wireless communications network can be any ad-hoc wireless communications network, with the terminal and reference terminals being adapted to operate as nodes in the network. The system and method of the present invention estimates a respective distance from a user terminal to each of the reference terminals, based on the respective signals received at the user terminal and the respective locations of the respective reference terminals. Furthermore, when estimating the respective distances from the user terminal to the reference terminals, the system and method can also perform error minimizing techniques.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
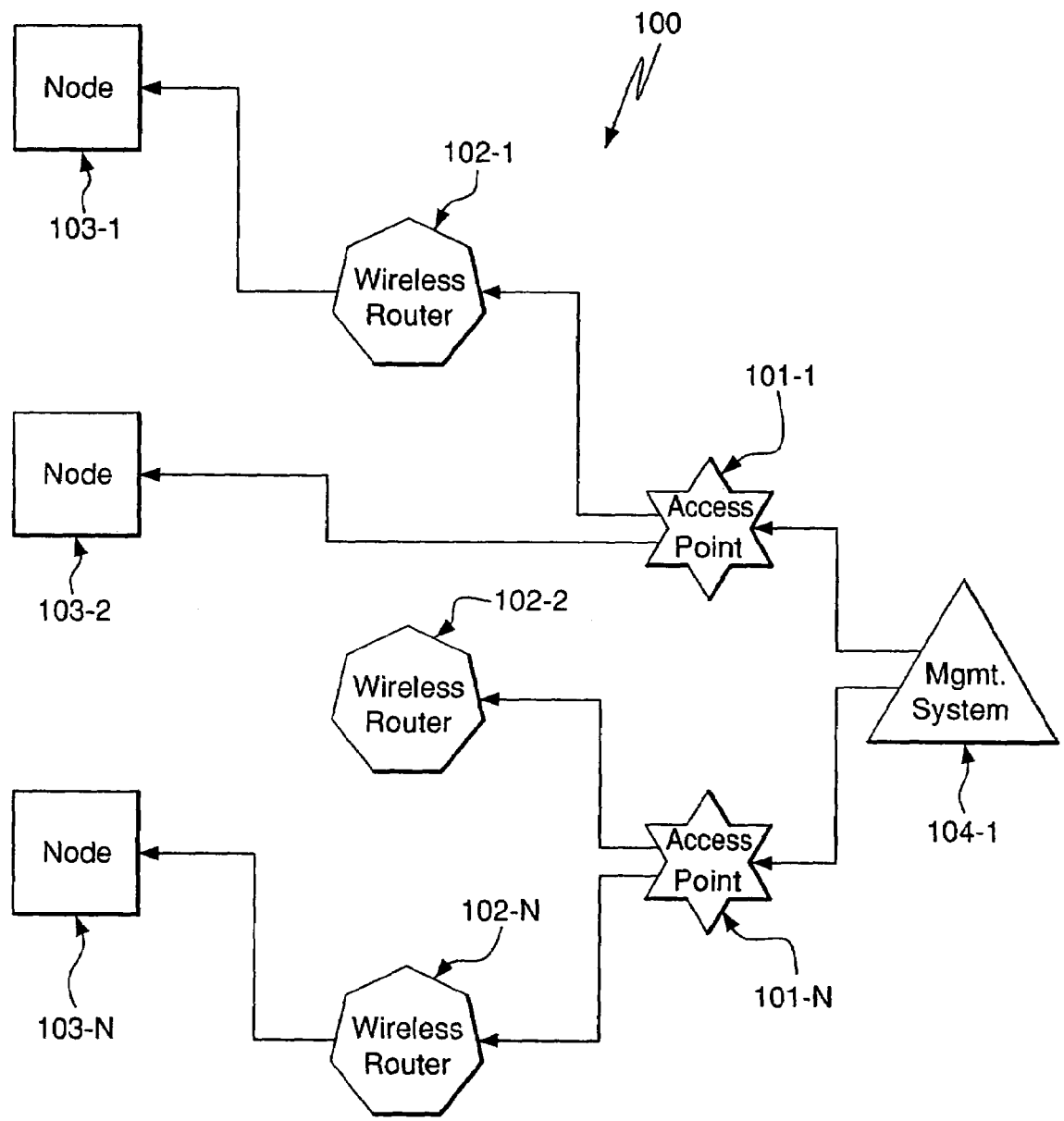
FIG. 1 is a block diagram of an example ad-hoc packet switched wireless communications network including a plurality of nodes in accordance with an embodiment of the present invention.

FIG. 1 is a block diagram illustrating an example of a wireless communications network 100 employing mobile access terminals in an example communication arrangement according to an embodiment of the present invention. As shown in FIG. 1, network 100, which can be referred to as a "portable network", includes a plurality of terminals, including access points 101-1 to 101-n, wireless routers 102-1 to 102-n, mobile nodes 103-1 to 103-n, and a network management system 104-1. It is noted that for purposes of this discussion, the terminals, or nodes, can be collectively referred to as access points 101, wireless routers 102, mobile nodes 103 and network management system 104, wherein the term "reference terminal" applies to both wireless routers and access points. The network management system 104 is an optional member of the network, providing enhanced network management and control functions. These functions include, but are not limited to, mobile node registration, authorization, and configuration, data logging, and system alarms.

The system and method of the preferred embodiment described below employs mobile access points, wireless routers, and mobile nodes which each contain at least one transceiver adapted to transmit and receive communication signals to and from other wireless routers, mobile nodes and other mobile access points. Each access point can be mounted to a mobile vehicle and receives substantially constant power from the vehicle. The access point may optionally be connected to a network management system which allows enhanced network monitoring and control. The wireless routers can be mounted to portable stands for easy deployment and are typically connected to a portable power source. The mobile nodes are battery powered, and are attached to equipment or personnel for tracking purposes. Each network node further includes technology which may determine an absolute node location containing latitude, longitude and altitude of a node, or a relative node location containing the distance and angle between nodes, or a combination of both absolute and relative location data.

The network management system 104 is an optional member of a fixed network that can include, for example, a core local access network (LAN), and a plurality of servers and gateway routers to provide network nodes with access to other networks, such as other ad-hoc networks, the public switched telephone network (PSTN) and the Internet. As can be appreciated by one skilled in the art, the nodes 101, 102 and 103 are capable of communicating with each other directly, or via one or more other nodes 101, 102 or 103 operating as a router or routers for packets being sent between nodes, as described in U.S. Pat. No. 5,943,322 to Mayor, and in U.S. Pat. Nos. 7,072,650, 6,807,165, and 6,873,839, referenced above. An example of such communication links are shown in FIG. 1, however, any number of communication arrangements can exist in the network 100 of FIG. 1.

Figure 2:
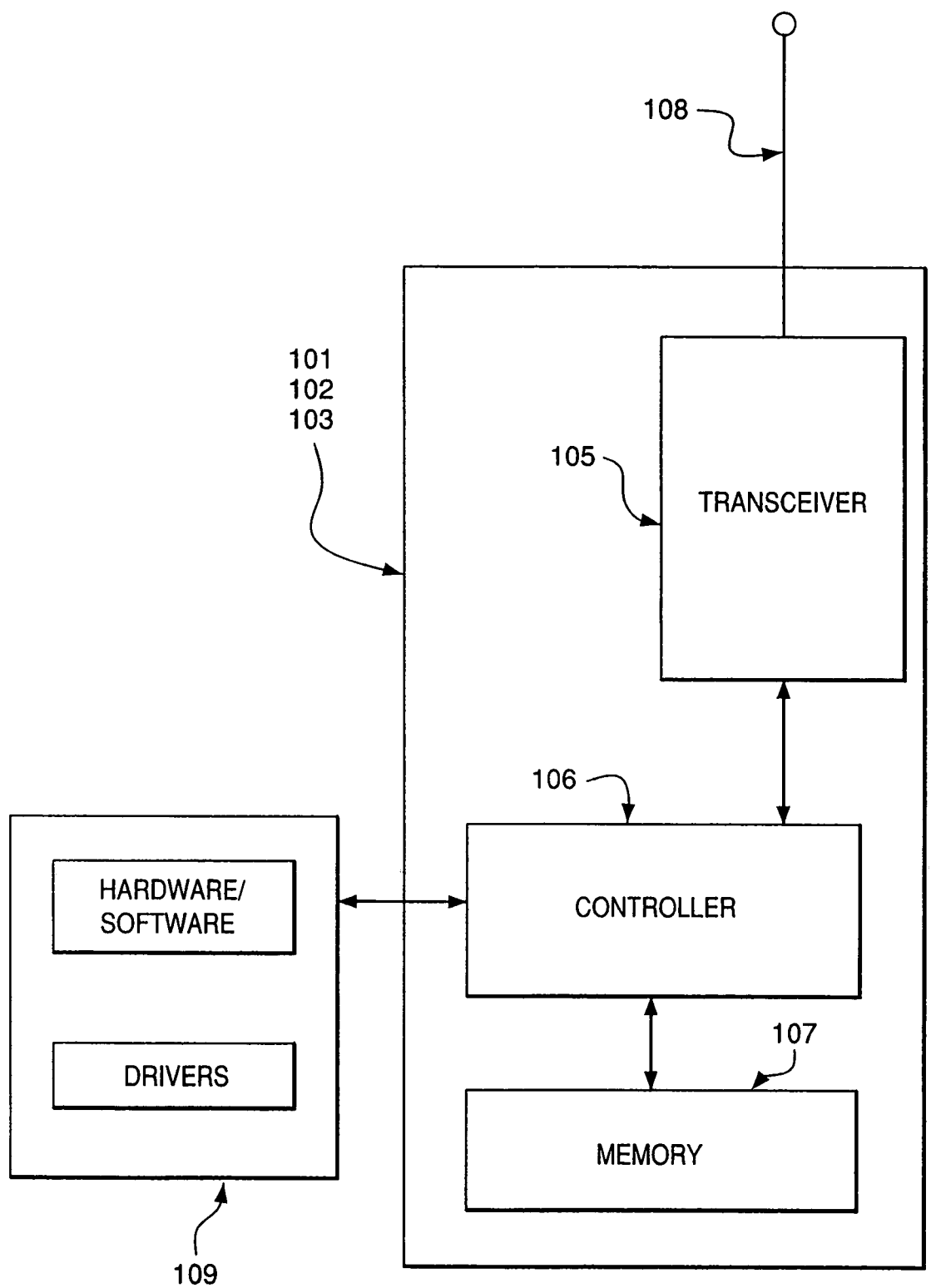
FIG. 2 is a block diagram of an example of a mobile node employed in the network shown in FIG. 1.

As shown in FIG. 2, each access point 101, wireless router 102, and mobile node 103 includes at least one transceiver 105 coupled with an antenna 108. The transceiver 105 is adapted to transmit and receive data packets over any frequency band, such as the Industrial, Scientific and Medical (ISM) band. However, the frequency and modulation scheme used by the transceiver 105 does not impact the implementation of the access points, routers, or nodes.

Each access point, wireless router, and mobile node further includes at least one processor, or controller 106, and a memory module 107 used for processing and storing information such as location and routing information. As further shown in FIG. 2, certain mobile nodes 103 may include a host 109 such as a notebook computer, a personal digital assistant (PDA), a mobile data unit or any other suitable device.

The mobile access point 101 of FIG. 1 can be physically constructed to be quite small, so as to be mounted on the interior or exterior of a vehicle, such as an automobile, truck, bus, train, taxi, police car, fire engine, or any other suitable movable vehicle. As shown in FIG. 2, the mobile access point 101 includes an antenna 108 that can be internally or externally mounted to the vehicle and can have a gain higher than that of an antenna similarly employed at a mobile node 103. The importance of this variation in antennae gain is described in greater detail below.

In applications in which the access point 101 is fixed on a vehicle, the access point can also include a connection to a substantially constant external power supply, such as the 12V DC power supply provided by the attached vehicle. In doing so, each mobile access point 101 can communicate with mobile nodes, other access points, and with the network management system 104 which provides the enhanced network management and control functions implemented throughout the network 100.

A mobile access point 101, wireless router 102 and mobile node 103 can further include positioning functionality, such as global positioning systems (GPS), differential navigation systems, or other positioning systems, such as those described in U.S. Pat. No. 6,728,545, referenced above, as well as other various techniques as can be appreciated by one skilled in the art. These, and other similar systems, enable each access point and wireless router to determine its relative and actual geographic location, which can be provided to other elements of the network 100 during operations, such as when any mobile node is attempting to use the mobile access point as an access point in the network 100. Additional details of such positioning systems are further discussed in U.S. Pat. No. 6,768,730 granted Jul. 27, 2004, entitled "System and Method for Efficiently Performing Two-Way Ranging to Determine the Location of a Wireless Node in a Communication Network", in U.S. patent application Ser. No. 09/996,603 filed on Nov. 30, 2001, and in U.S. Pat. No. 6,728,545, referenced above, the entire contents of each being incorporated herein by reference.

Figure 3A:
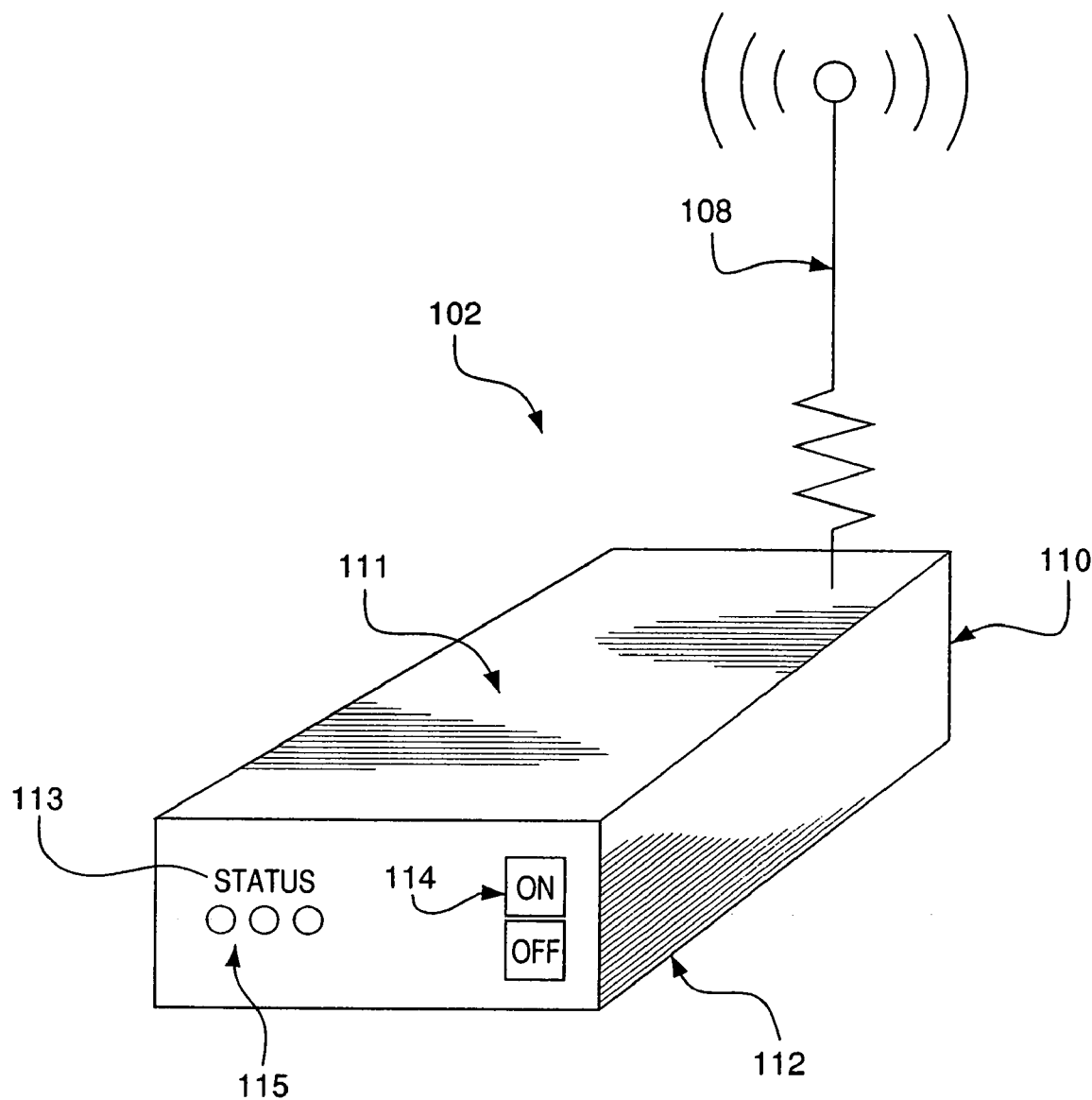
FIG. 3A is a diagram of an example of a wireless router employed in the network shown in FIG. 1.

In FIG. 3A, a diagram of an example wireless router 102 used in the network 100 of FIG. 1 is shown. The router includes a housing 110, which can be constructed as a rectangular box with a top side 111 mechanically coupled with a bottom side 112, each having dimensions, for example, of approximately 3 inches by 4 inches. The top and bottom sides are separated by four perimeter sides creating an overall dimension for the wireless router of 3 inches by 4 inches by 1 inch. These dimensions are presented as examples for use in this embodiment, however alternate embodiments can use dimensions adapted for any particular installation or use.

Figure 3B:
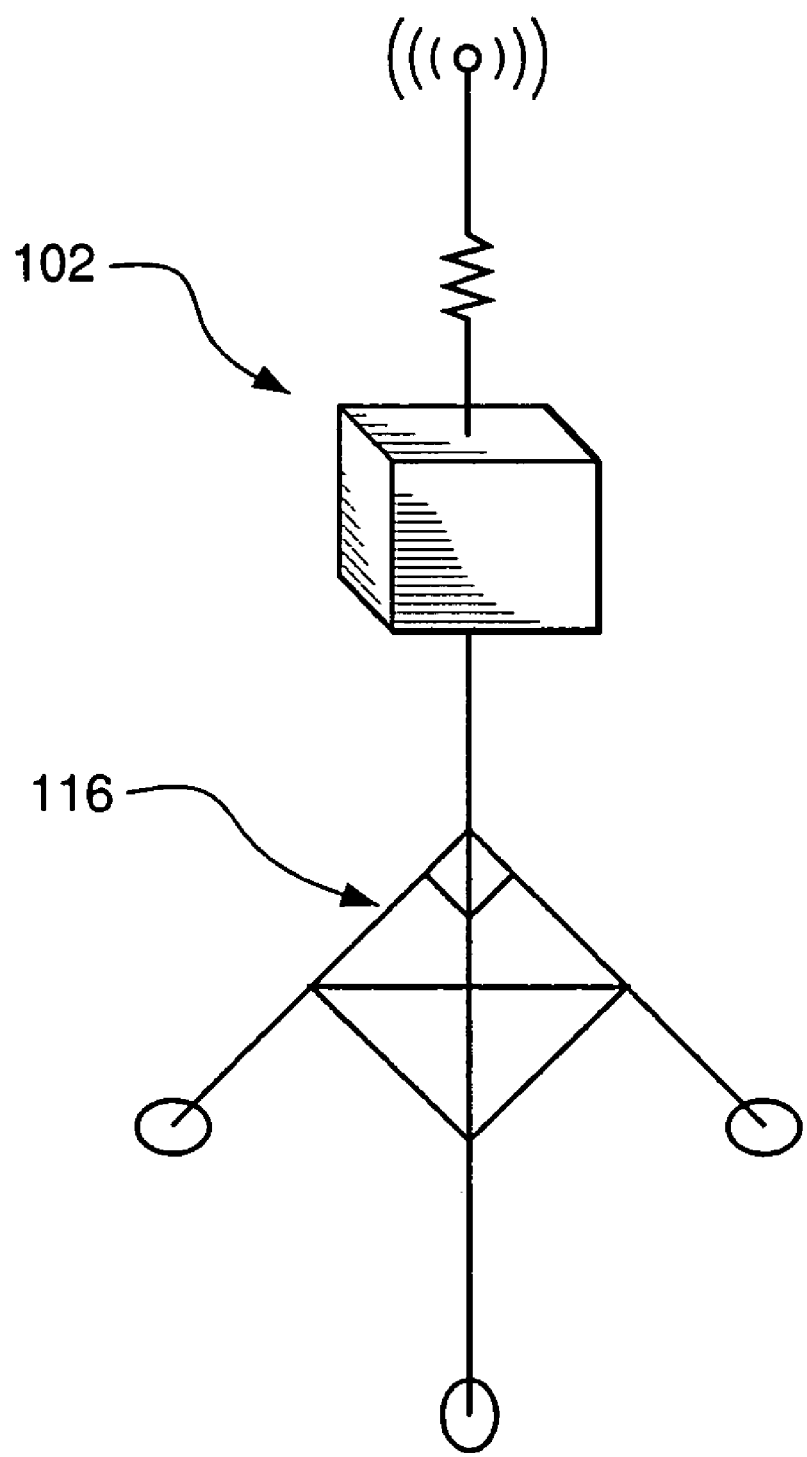
FIG. 3B is a diagram of an example of a wireless router as shown in FIG. 3A mounted on a portable structure in accordance with an embodiment of the present invention.

A first perimeter side 113 can be used to mount operator interface controls and indicators within a series of openings. Such controls and indicators can include a simple to use on-off switch 114 and router status indicators 115. As known to those skilled in the art, the portable wireless router 102 can include a connection to a power supply (not shown) which may be either internal or external to the device, and a mounting mechanism (not shown) which allows the router to be mounted on a portable structure as shown in FIG. 3B. FIG. 3B is a conceptual diagram of a wireless router as shown in FIG. 3A mounted on a portable structure 116, allowing the antennae of the router 102 to operate at a level approximately five to six feet from the deployment surface.

Figure 4:
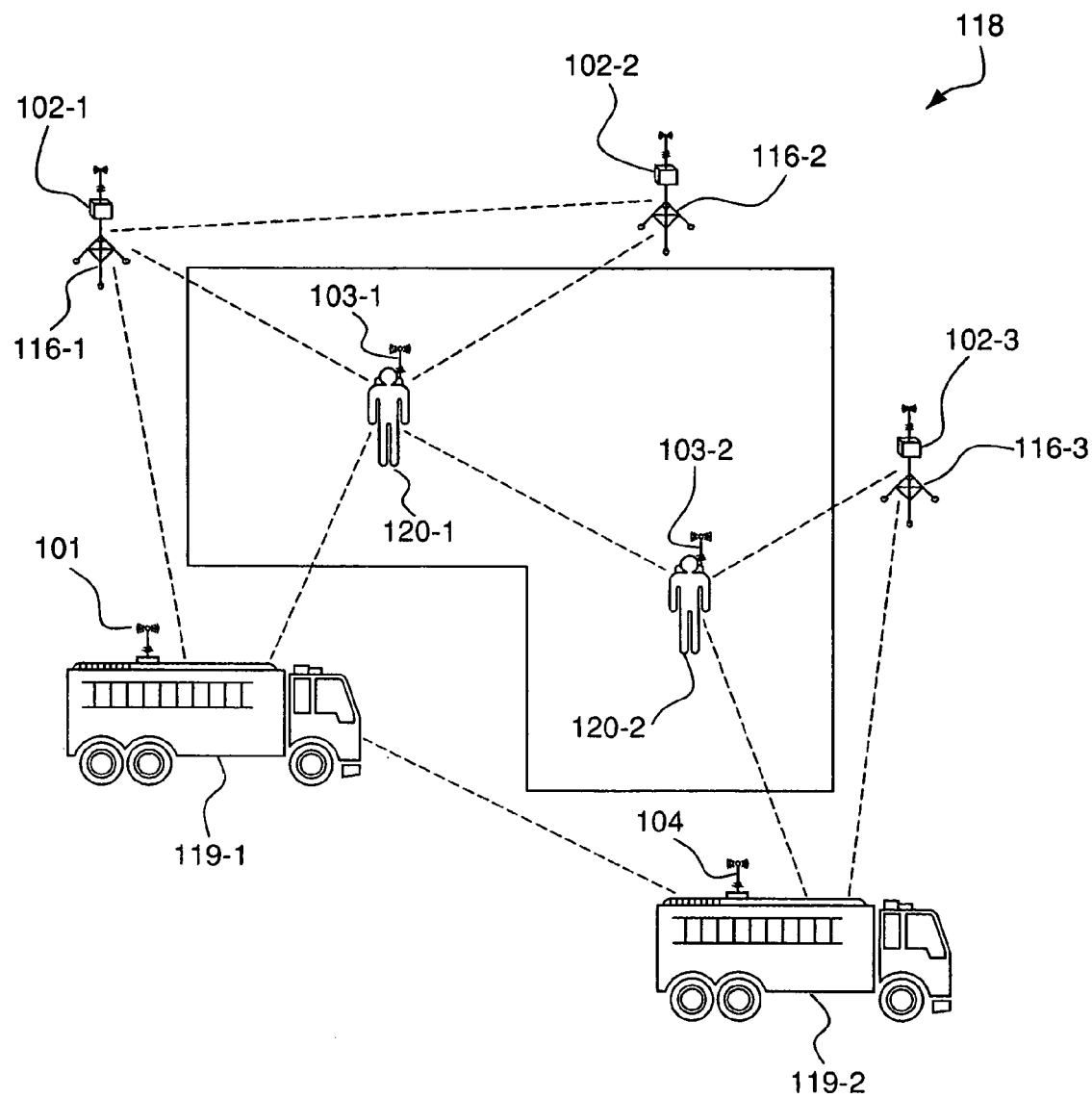
FIG. 4 is a diagram illustrating an example of how an embodiment the invention may be deployed in a fire/rescue scenario in accordance with an embodiment of the present invention.

FIG. 4 is a conceptual diagram of how an embodiment of the present invention can be deployed, such as in a fire rescue scenario 118, in accordance with an embodiment of the present invention. In a typical fire rescue scenario, several rescue vehicles, such as fire vehicles 119-$n$ may be present at a location, about which, many individual fire personnel 120-$n$ may be working. Upon arrival, or at locations perhaps known to frequently require fire rescue presence, multiple routers 102-$n$ and portable structures 116-$n$ may be placed about a work area. FIG. 4 shows an example deployment where an access point 101 and the network management system 104 are located in rescue vehicles 119-1 and 119-2, respectively, wireless routers 102-1, 102-2 and 102-3 are deployed about the area on portable structures 116-1, 116-2 and 112-3, respectively, and individual personnel 120-1 and 120-2 are each carrying mobile nodes 103-1 and 103-2, respectively. As shown in FIG. 4, each mobile node 103 can communicate with other mobile nodes either directly, or indirectly using the wireless routers 102, access point 101, or network management system 104. Each mobile node may also communicate with the network management system 104 either directly, or indirectly in a similar fashion. Since numerous routers 102 are distributed about the area, communication links between mobile nodes may be handed off from one device to another as the mobile node moves about the area.

As noted above, nodes can be provided antennae and corresponding communication controls of variable gain. For example in FIG. 1, the mobile access point 101 can have a gain higher than that of mobile node 103. Still further, each node can include an "emergency power boost button", which increases gain, or power output of the transceiver, for increased range or in-building wall/floor signal penetration. Normally the routers 102 and mobile nodes 103 operate within FCC limits, however in emergency mode each can output at levels above normal FCC limits, or above normal battery operation levels that are set to maximize battery life.

Figure 5:
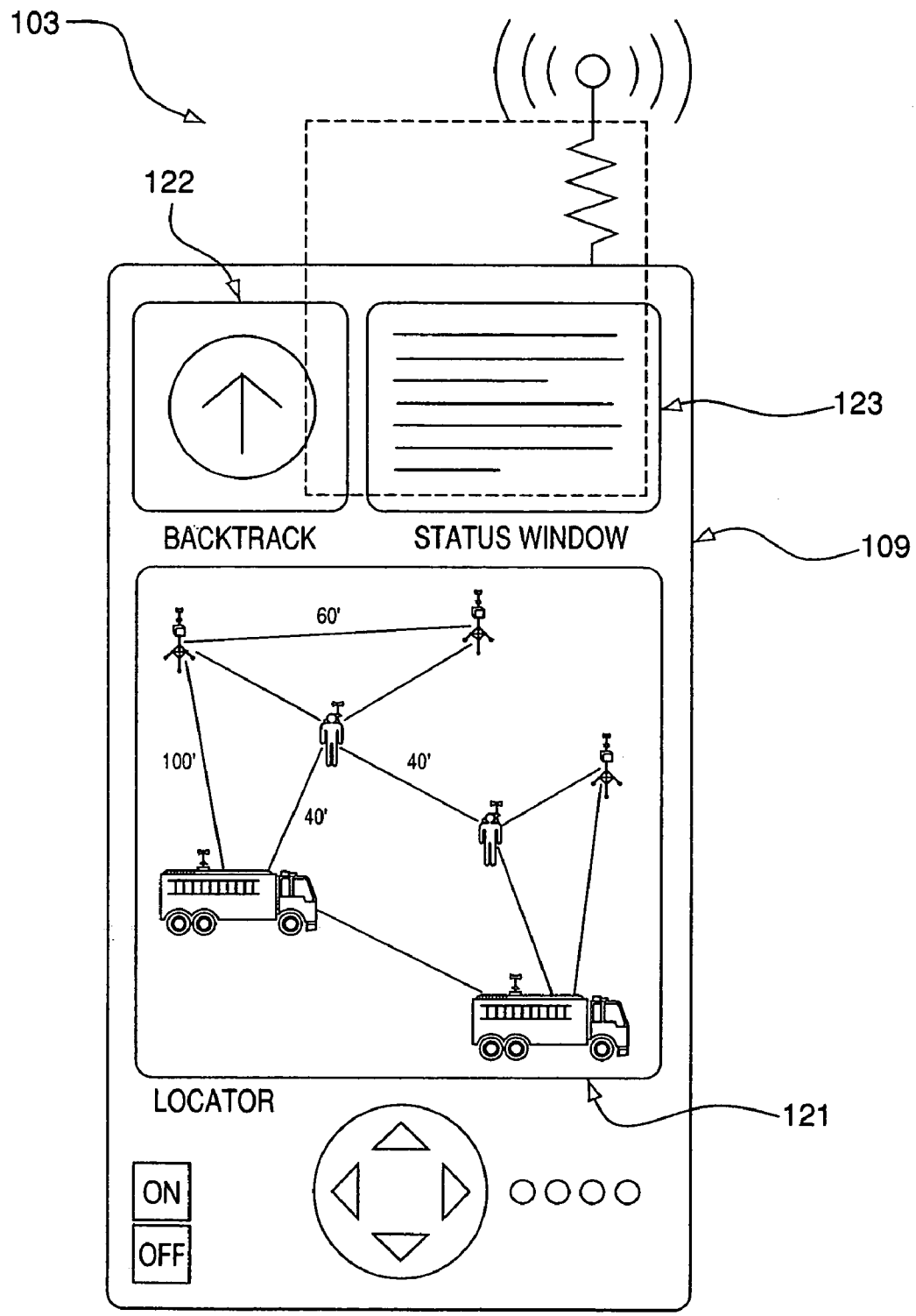
FIG. 5 is a diagram of an example of a mobile node which displays the location of deployed equipment and personnel in accordance with an embodiment of the present invention.

FIG. 5 is a conceptual diagram of a mobile node 103 which displays the location of deployed equipment and personnel as shown in FIG. 4. FIG. 5 shows an example of a mobile node 103 with an attached host 109 which contains a graphics window 121 for displaying the location of the devices in the portable network 100, a backtrack button 122 which allows the user to retrace his steps, and a status window 123 for textual information. Alternate operator interface controls may be included in other embodiments, or where merely attached to assets, minimal controls may be provided. In the embodiment shown in FIG. 5, only relative locations are displayed. For example, the deployment of nodes 101, 102, 103 and 104 of FIG. 4 are shown via the graphics window 121 of mobile node 103, including distance and direction of each. In yet another embodiment wherein the access points 101 and wireless routers 102 contain absolute location information, the latitude, longitude and altitude of each could also be displayed. Also, access points 101, wireless routers 102, and network management system 104 can include these display features and functionality as well.

The embodiment of the present invention may be applied in a number of scenarios, however for illustration purposes, the description below presents the embodiment applied to an emergency services deployment scenario. The primary aim is to allow emergency personnel, individually or in teams, to locate other emergency personnel and assets in an emergency deployment environment. In the embodiment shown, emergency teams take all the required systems and equipment with them, which may then be quickly deployed and operated, then later removed. As noted earlier, in an alternate embodiment in which deployment regularly occurs or assets are managed and stored, such equipment may be deployed and left in place.

In the deployment described below, the embodiment does not require absolute positioning for tracking personnel and assets, as relative positions are sufficient. In other words, a fireman needs to know where he is relative to the entrance of a building and other firemen and equipment, but does not need to know that a location is in New York or Los Angeles.

As shown in FIG. 4, access points 101 are located in fire trucks or other vehicles 119 located at various positions about the deployment area 118. Multiple wireless routers 102, mounted on raised devices 116, are deployed away from the access points 101 to allow accurate location and RF coverage for the area. Mobile nodes 103 are used by each emergency personnel 120 and other assets (not shown) to allow tracking and locating throughout the deployment area 118. As mobile nodes 103 are deployed, communications are established between mobile nodes 103, wireless routers 102, access point 101 and the network management system 104. An individual with a mobile node that includes a host device having a display as shown in FIG. 5 will then be able to identify an individual position relative to devices, as well as directional information between devices. Additionally, the network management system will be able to manage overall deployment, such as locating and tracking all personnel, equipment and vehicles at the scene.

In an example implementation of an embodiment of the present invention, the deployment area 118 is first identified and emergency vehicles 119-1 and 119-2 arrive. Emergency personnel 120-1 and 120-2 deploy multiple wireless routers 102-1, 102-2 and 102-3 to provide area coverage as shown in FIG. 4. Each individual fire personnel 120 and asset (not shown) carries a mobile node 103 and is free to enter any building at the scene with full voice and data communication established and maintained between each other, either directly, or via the deployed wireless routers 102 using the mobile node 103 and associated attached host device 109. Each mobile node 103 also allows communication capability with the network management system 104 located at a vehicle 119-2 at the deployment area. The mobile nodes 103 and the network management system 104 will each display relative locations of each device 101, 102, 103 and 104 by showing the location of the personnel, vehicles and wireless routers in the portable network. Absolute location can also be displayed if the access points 101 and wireless routers 102 have a location capability such as GPS.

Buildings provide additional challenges to wireless communication, and coverage within buildings at the deployment area 118 shown in FIG. 4 may be limited or non-existent in some circumstances. In cases where buildings pose coverage difficulties, the embodiment of the present invention shown in FIG. 4 can provide a very simple and cost effective solution. Since the wireless router 102 is a small device as shown in FIG. 3A, it can easily be carried into any location, floor or stairwell, within a building by firemen. As firemen reach the limit of communication coverage between the exterior and interior of a building, they can deploy a wireless router 102 to serve as a three-dimensional bridging communication link, or "bread crumb", and extend coverage further into the building interior. This extended fireman's connection to the building exterior can now be "daisy chained" through one or more wireless routers 102 deployed at the scene and throughout the building. Furthermore, depending upon the deployment of the wireless routers, three-dimensional location determination can also be accomplished and provided to the mobile nodes and network management system.

Another example of the use of relative positioning in accordance with an embodiment of the present invention is "backtracking" or path documentation using the mobile node 103 and the deployed wireless routers, or "breadcrumbs" described above. When enabled, this feature will keep up to a three-dimensional track of the movements of the fire fighter from a first origination point, such as a vehicle or home position, to a present point. In doing so, the fire fighter can use the path documentation, or "breadcrumb" trail, to retrace his steps back to the fire truck when the application replays this information in reverse upon the display features of the mobile node 103. Still another feature of the embodiment of the present invention disclosed above is the ability to locate disabled personnel. In a manner similar to the path documentation feature described above, a mobile node 103 can be used to determine and communicate the position of a disabled mobile node user at the deployment scene, and the direction, distance and path from other mobile nodes, thereby allowing the disabled user to be located electronically.

Additional applications of the embodiment relate to other emergency services. The small size of the mobile nodes 103 and relatively low cost, allow their use in tracking any deployment of personnel or assets. This might include assets such as generators or defibrillators, or personnel such as patients in a triage unit. Still other applications can include deployments wherein police dogs are tracking suspects and various police units are arriving, and each may be easily detected, positioned and referenced.

A significant benefit of the present embodiment is that assets can be tracked and located quickly without the need for GPS systems. As can be appreciated by those skilled in the art, GPS systems suffer from being slow to initially synchronize, and typically require line of sight communication. Such devices are often ineffective in congested, or "built up" areas. The embodiment described above does not require the cost and complexity of GPS or the absolute location that such systems provide.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for displaying node location information in an ad-hoc communications network, said network including a plurality of nodes being adapted to transmit and receive signals to and from other nodes in said network, the method comprising:

distributing a plurality of nodes at a deployment area and calculating a position of at least one node of said plurality based on distance measurements calculated by certain nodes of said plurality, and controlling said certain nodes to communicate information pertaining to said position to a first node of said plurality;

controlling said first node of said plurality to calculate and to display, based on said position information, at least one of an absolute position of said at least one node, a relative position of said at least one node and a first path of movement of said at least one node; and controlling said first node to calculate and display said first path, comprising a series of calculated positions based on at least one calculated position of said at least one node determined at an equal time interval over a time period wherein said at least one node travels from an origination position to a destination position.

2. A method as claimed in claim 1, wherein:
said plurality of nodes includes at least one of a mobile node, wireless router node, access point node and network manager node.

3. A method as claimed in claim 1, wherein:
said distributing said plurality of nodes at said deployment area establishes at least one communication route between each node of said plurality.

4. A method as claimed in claim 1, wherein:
said distributing said plurality of nodes at said deployment area establishes at least one communication route between each node of said plurality and said first node.

5. A method as claimed in claim 1, wherein:
said calculating said position of said at least one node is based on at least one of a global positioning system, a differential navigation system and a triangulation system.

6. A method as claimed in claim 1, further comprising:
controlling said first node to calculate and display said absolute position of said at least one node including at least one of a latitude, a longitude and an altitude position.

7. A method as claimed in claim 1, further comprising:
controlling said first node to calculate and display said relative position of said at least one node including at least one of a distance and an angle between said first node and said at least one node.

8. A method as claimed in claim 1, further comprising:
controlling said first node to calculate and display said relative position of said at least one node including at least one of a distance and an angle between said at least one node and a second node of said plurality.

9. A method as claimed in claim 1, further comprising:
controlling said first node to display said series of calculated positions in a reverse order, said reversed order illustrating said first path from said destination position to said origination position.

10. A method as claimed in claim 1, further comprising:
controlling said first node to display said series of calculated positions in a forward order, said forward order illustrating said first path from said origination position to said destination position.

11. A method as claimed in claim 1, further comprising:
controlling said first node to calculate and display a second path between said first node and said at least one node, comprising a series of calculated positions between said first node and said at least one node.

12. A method as claimed in claim 1, wherein:
said first node is said at least one node; and
said controlling step controls said first node to calculate and display its own at least one of said absolute position, said relative position and said first path.

13. A method as claimed in claim 1, wherein:
said at least one node is a mobile node.

14. A method as claimed in claim 12, wherein:
said first node, which is said at least one node, is a mobile node.

15. A method as claimed in claim 1, wherein:
said certain nodes are stationary nodes.

16. A method as claimed in claim 1, wherein:
said nodes, including said at least one node, said certain nodes, and said first node, are adapted to communicate data packets with each other via other nodes in said network, with said other nodes acting as routers.

17. A system for displaying node location information in an ad-hoc communications network, said network including a plurality of nodes being adapted to transmit and receive signals to and from other nodes in said network, the system comprising:
a plurality of nodes, adapted to deploy and to occupy a deployment area and in response, to calculate a position of at least one node of said plurality based on distance measurements calculated by certain nodes of said plurality, which communicate information pertaining to said position to a first node of said plurality; and
said first node being adapted, based on said position information, to calculate and to display at least one of an absolute position of said at least one node, a relative position of said at least one node and a first path of movement of said at least one node, wherein:
said first node is adapted to calculate and display said first path, comprising a series of calculated positions based on at least one calculated position of said at least one node determined at an equal time interval over a time period wherein said at least one node travels from an origination position to a destination position.

18. A system as claimed in claim 17, wherein:
said plurality of nodes includes at least one of a mobile node, wireless router node, access point node and network manager node.

19. A system as claimed in claim 17, wherein:
said plurality of nodes is adapted to deploy and to occupy a deployment area to establish at least one communication route between each node of said plurality.

20. A system as claimed in claim 17, wherein:
said plurality of nodes is adapted to deploy and to occupy a deployment area to establish at least one communication route between each node of said plurality and said first node.

21. A system as claimed in claim 17, wherein:
said plurality of nodes is adapted to calculate said position of said at least one node based on at least one of a global positioning system, a differential navigation system and a triangulation system.

22. A system as claimed in claim 17, wherein:
said first node is adapted to calculate and display said absolute position of said at least one node including at least one of a latitude, a longitude and an altitude position.

23. A system as claimed in claim 17, wherein:
said first node is adapted to calculate and display said relative position of said at least one node including at least one of a distance and an angle between said first node and said at least one node.

24. A system as claimed in claim 17, wherein:
said first node is adapted to calculate and display said relative position of said at least one node including at least one of a distance and an angle between said at least one node and a second node of said plurality.

25. A system as claimed in claim 17, wherein:
said first node is adapted to display said series of calculated positions in a reverse order, said reversed order illustrating said first path from said destination position to said origination position.

26. A system as claimed in claim 17, wherein:
said first node is adapted to display said series of calculated positions in a forward order, said forward order illustrating said first path from said origination position to said destination position.

27. A system as claimed in claim 17, wherein:
said first node is adapted to calculate and display a second path between said first node and said at least one node, comprising a series of calculated positions between said first node and said at least one node.

28. A system as claimed in claim 17, wherein:
said first node is said at least one node, and said first node calculates and displays its own at least one of said absolute position, said relative position and said first path.

29. A system as claimed in claim 17, wherein:
said at least one node is a mobile node.

30. A system as claimed in claim 28, wherein:
said first node, which is said at least one node, is a mobile node.

31. A system as claimed in claim 17, wherein:
said certain nodes are stationary nodes.

32. A system as claimed in claim 17, wherein:
said nodes, including said at least one node, said certain nodes, and said first node, are adapted to communicate data packet with each other via other nodes in said network, with said other nodes acting as routers.

33. A system for displaying node location information in an ad-hoc communications network, said network including a plurality of nodes being adapted to transmit and receive signals to and from other nodes in said network, the system comprising:
a plurality of nodes, adapted to deploy and to occupy a deployment area and in response, to calculate a position of at least one node of said plurality based on distance measurements calculated by certain nodes of said plurality, which communicate information pertaining to said position to a first node of said plurality; and
said first node, being adapted, based on said position information, to calculate and to display at least one of an absolute position of said at least one node, a relative position of said at least one node and a first path of movement of said at least one node, wherein:
at least one node of said plurality of nodes includes a variable gain transceiver adapted to operate at a first and second gain level, said second gain level greater than or equal to said first gain level.

* * * * *